United States Patent
Tsuji

(10) Patent No.: US 8,925,796 B2
(45) Date of Patent: Jan. 6, 2015

(54) ARTICLE WITH VISUAL CODE, VISUAL CODE GENERATING APPARATUS AND INFORMATION CONVEYING METHOD

(76) Inventor: Susumu Tsuji, Tokyo (JP)

(*) Notice: Subject to any disclaimer, the term of this patent is extended or adjusted under 35 U.S.C. 154(b) by 292 days.

(21) Appl. No.: 13/509,631

(22) PCT Filed: Dec. 11, 2009

(86) PCT No.: PCT/JP2009/070731
§ 371 (c)(1),
(2), (4) Date: May 14, 2012

(87) PCT Pub. No.: WO2011/061867
PCT Pub. Date: May 26, 2011

(65) Prior Publication Data
US 2013/0001296 A1    Jan. 3, 2013

(30) Foreign Application Priority Data
Nov. 20, 2009  (JP) .................. 2009-265445

(51) Int. Cl.
*G06F 17/00* (2006.01)
*G06K 7/10* (2006.01)
*G06K 19/06* (2006.01)
*G09F 3/00* (2006.01)

(52) U.S. Cl.
CPC *G06K 7/10* (2013.01); *G06K 19/06* (2013.01); *G09F 3/00* (2013.01)
USPC .......................................... 235/375; 235/494

(58) Field of Classification Search
USPC .................................. 235/375, 494, 462.09
See application file for complete search history.

(56) References Cited

U.S. PATENT DOCUMENTS

| 6,869,022 | B2* | 3/2005 | Corby, Jr. ............. 235/494 |
| 7,149,000 | B1* | 12/2006 | Sakai et al. ......... 358/3.28 |
| 7,207,491 | B2* | 4/2007 | Lubow .............. 235/462.01 |

FOREIGN PATENT DOCUMENTS

| EP | 1 158 456 A2 | 11/2001 |
| JP | 2009-163720 | 7/2009 |
| JP | 2009-230729 | 10/2009 |
| WO | 2007107533 A2 | 9/2007 |

OTHER PUBLICATIONS

International Search Report dated Mar. 9, 2010 in corresponding International Application No. PCT/JP2009/070731.
Office Action received in Russian Appln. No. 2012125631, dated Nov. 1, 2013 with English language translation.
Supplementary European Search Report dated Apr. 17, 2014 in corresponding International Application No. PCT/JP2009070731.

* cited by examiner

*Primary Examiner* — Ahshik Kim
(74) *Attorney, Agent, or Firm* — The Law Office of Michael E. Kondoudis

(57) ABSTRACT

An article having a visual code that can visually and directly convey a message to a human and accurately and indirectly convey information through an apparatus with an optical reading function. Visual code 1 is attached to an article. In visual code 1, symbol arrangement pattern 13, which indicates a message that can be visually recognized by a human, is formed by forming code space 11 by arranged multiple regions 12 in a grid, selecting one or more than one region 12 from among multiple regions 12 in code space 11, and placing pattern element 15 in each of selected regions 12. Each region 12 where pattern element 15 is placed so as to form symbol arrangement pattern 13 among multiple regions 12 in code space 11 indicates ON; each region 12 where pattern element 15 is not placed indicates OFF.

10 Claims, 7 Drawing Sheets

Fig. 7

| Message Text Information | B12 | |
|---|---|---|
| Symbol Parameter (Binary Information) | 1111010001100011000110001111101000110001100011000111110 0011001010000100001000010000100001000010000100001000010 1111100001000010000100010001000100010001000010000111111 | |
| Linked Information Discrimination number | #1 | 1001101 |
| | #2 | 1001110 |
| | #3 | 1001111 |
| Linked Information | #1 | A Station B12 Exit Guide: LM Driver's License Center, PQR Local Office, JK Tax Office, STU Department Store, EF Home Center, W Mart |
| | #2 | B Station B12 Exit Guide: VW Library, XY Park, CD International Exhibition Hall |
| | #3 | C Station B12 Exit Guide: EF Hospital, GH Elementary School, OP Corp. YZ Lab |

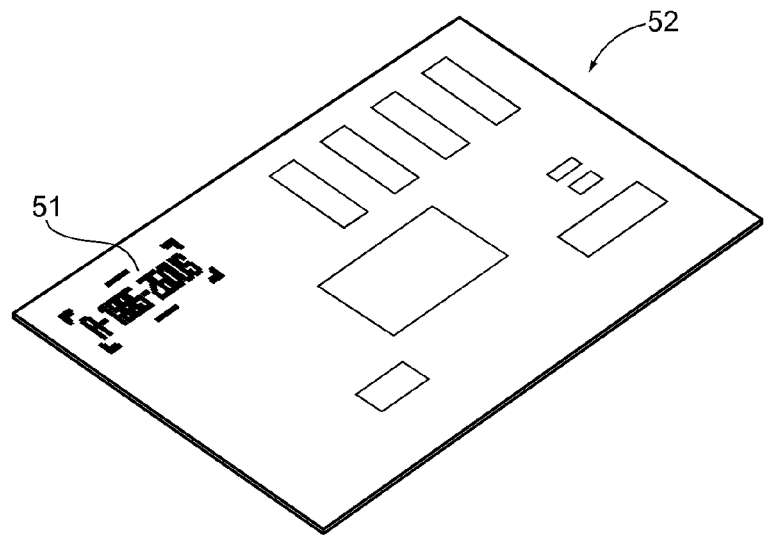

51, 52

ARTICLE WITH VISUAL CODE, VISUAL CODE GENERATING APPARATUS AND INFORMATION CONVEYING METHOD

TECHNICAL FIELD

The present invention relates to an article with a visual code that can visually and directly convey a message to a human, and can indirectly convey information different from the message to a human by using an apparatus having an optical reading function; a visual code generating apparatus for generating such a visual code; and an information conveying method for directly and visually conveying a message, and indirectly conveying information different from the message by using an apparatus having an optical reading function.

BACKGROUND ART

At present, the technique of attaching or printing a barcode to an article (or a product), and inputting the information on the article into a cash register or a computer used for managing articles, by reading the barcode with a reading apparatus having a scanner has been widely spread (see patent document 1). A barcode used for such a technique typically represents numbers or characters by varying the widths of lines arranged in a striped pattern. Also, a barcode is a one-dimensional code that has information only in a lateral direction.

In recent years, a two-dimensional code, such as a QR code (trademark), that represents numbers or characters by arranging dots in longitudinal and lateral directions has been also spread. A two-dimensional code can hold a large amount of information in itself by encoding the information, compared to a one-dimensional code such as a barcode, and therefore, a two-dimensional code is used in fields where a large number of information is handled, such as part ordering management in huge factories, product shipping management by wholesale dealers, or product sales management in vending machines (see patent document 2). Also, the technique of providing a mobile phone having a built-in camera and the function of reading a two-dimensional code; reading a two-dimensional code printed in a leaflet by using the mobile phone having a built-in camera; and thus conveying information on products, services, events or the like through the two-dimensional code and the mobile phone having a built-in camera recently has been spread.

ART DOCUMENTS

Gazette No. Tokkai-hei 5-54211 (JP 5-54211) and Gazette No. Tokkai 2003-85625 (JP 2003-85625)

SUMMARY OF INVENTION

A barcode, which is a one-dimensional code, is formed by arranging lines with different widths in a striped pattern. A barcode therefore has the advantages that it is easy for an apparatus with an optical reading function such as a scanner to read one, and information can be accurately conveyed by using such an apparatus. However, a barcode cannot convey any message through visual observation by a human. That is, the arrangement of lines with different widths does not express any message that can be visually recognized by a human.

The same goes for a two-dimensional code. When a human simply see a two-dimensional code, the arrangement of dots in the two-dimensional code looks like a mere random pattern, and he or she cannot recognize any meaningful message from the two-dimensional code.

Neither a barcode nor a two-dimensional code provides any message that can be visually recognized by a human, although each code can be attached to or printed on an article or the like, and thus can be placed under the state where anyone can see it. It is undesirable that a barcode or a two-dimensional code attached to or printed on an article is not attractive at all for consumers or the like who directly see the article, and it is also undesirable that attaching a barcode or a two-dimensional code makes the design of an article worse.

Further, since neither a barcode nor a two-dimensional code provides any message that can be visually recognized by a human, the opportunity or the place to attach a barcode or a two-dimensional code to an article is restricted depending on the ways or forms of the utilization of the article. For instance, it is undesirable that a barcode or a two-dimensional code is arranged in a noticeable part of an article that is displayed in public, such as the front face, the central part of the article. Also, in the case of an article with a small surface area, it is difficult to secure an area to attach a barcode or a two-dimensional code in the article, in addition to the area where the name of the article and the name of the manufacturer of the article are printed.

The present invention has been invented in consideration of, for instance, abovementioned problems. An object of the present invention is to provide an article having a visual code that it is possible to visually and directly convey a message to a human, and to accurately and indirectly convey information by using an apparatus having an optical reading function, and also to provide a visual code generating apparatus, and further to provide an information conveying method.

Solutions for Problems

To achieve the abovementioned object, the first aspect of an article according to the present invention is characterized in that the article has a visual code wherein a symbol arrangement pattern, which indicates a message that can be visually recognized by a human, is formed by selecting one or more than one region from among a plurality of regions arranged like a grid in a two-dimensional space, and placing a pattern element with a predetermined shape in each of the selected regions; each of the regions where the pattern element is placed so as to form the symbol arrangement pattern among the plurality of regions in the two-dimensional space indicates ON; each of the regions where the pattern element is not placed so as to form the symbol arrangement pattern among the plurality of regions in the two-dimensional space indicates OFF; and linked information that is different from the message is linked to binary information specified by the regions indicating ON and the regions indicating OFF.

In the first aspect of an article according to the present invention, the second aspect of an article according to the present invention is characterized in that a guide pattern, which enables a reading apparatus to correct a misalignment between the reading apparatus and the visual code, or enables the reading apparatus to recognize a reading direction of the visual code, when the reading apparatus reads the visual code, is placed in the two-dimensional space where the visual code is formed.

In the first or second aspect of an article according to the present invention, the third aspect of an article according to the present invention is characterized in that an arrangement information pattern, which indicates the number of columns, the number of rows or the number of symbols of the symbol arrangement pattern, is placed in the two-dimensional space where the visual code is formed.

In any one of the first to third aspects of an article according to the present invention, the fourth aspect of an article according to the present invention is characterized in that a plurality of pieces of linked information are linked to the binary information, and a discriminating information pattern for discriminating the plurality of pieces of linked information linked to the binary information is placed in the two-dimensional space where the visual code is formed.

In any one of the first to fourth aspects of an article according to the present invention, the fifth aspect of an article according to the present invention is characterized in that a color information pattern, which indicates a color of the symbol arrangement pattern, is placed in the two-dimensional space where the visual code is formed.

To achieve the abovementioned object, the first aspect of a visual code generating apparatus according to the present invention is characterized in that the visual code generating apparatus is an apparatus for generating a visual code by making a link between a symbol arrangement pattern, which can be visually recognized as a message by a human and can be recognized by an apparatus, and linked information that is different from the message, the visual code generating apparatus comprises: a pattern forming unit for forming a symbol arrangement pattern, which indicates a message that can be visually recognized by a human, by selecting one or more than one region from among a plurality of regions arranged like a grid in a two-dimensional space, and placing a pattern element with a predetermined shape in each of the selected regions; and an information linking unit for recognizing each of the regions where the pattern element is placed so as to form the symbol arrangement pattern among the plurality of regions in the two-dimensional space where the symbol arrangement pattern is formed by the pattern forming unit, as ON, recognizing each of the regions where the pattern element is not placed so as to form the symbol arrangement pattern among the plurality of regions in the two-dimensional space where the symbol arrangement pattern is formed by the pattern forming unit, as OFF, and linking linked information that is different from the message to binary information specified by the regions recognized as ON and the regions recognized as OFF.

In the first aspect of a visual code generating apparatus according to the present invention, the second aspect of a visual code generating apparatus according to the present invention is characterized in that the visual code generating apparatus further comprises a guide pattern forming unit for placing a guide pattern, which enables a reading apparatus to correct a misalignment between the reading apparatus and the visual code, or enables the reading apparatus to recognize a reading direction of the visual code, when the reading apparatus reads the visual code, in the two-dimensional space.

In the first or second aspect of a visual code generating apparatus according to the present invention, the third aspect of a visual code generating apparatus according to the present invention is characterized in that the visual code generating apparatus further comprises an arrangement information pattern forming unit for placing an arrangement information pattern, which indicates the number of columns, the number of rows or the number of symbols of the symbol arrangement pattern, in the two-dimensional space.

In any one of the first to third aspects of a visual code generating apparatus according to the present invention, the fourth aspect of a visual code generating apparatus according to the present invention is characterized in that the information linking unit links a plurality of pieces of linked information to the binary information, and the visual code generating apparatus further comprises a discriminating information pattern forming unit for placing a discriminating information pattern for discriminating the plurality of pieces of linked information linked to the binary information, in the two-dimensional space.

In any one of the first to fourth aspects of a visual code generating apparatus according to the present invention, the fifth aspect of a visual code generating apparatus according to the present invention is characterized in that the pattern forming unit sets a color of the symbol arrangement pattern, and the visual code generating unit further comprises a color information pattern forming unit for placing a color information pattern, which indicates a color of the symbol arrangement pattern, in the two-dimensional space.

To achieve the abovementioned object, an information conveying method according to the present invention comprises: a step of generating a visual code by using a visual code generating apparatus for generating the visual code wherein a symbol arrangement pattern, which indicates a message that can be visually recognized by a human, is formed by selecting one or more than one region from among a plurality of regions arranged like a grid in a two-dimensional space, and placing a pattern element with a predetermined shape in each of the selected regions; each of the regions where the pattern element is placed so as to form the symbol arrangement pattern among the plurality of regions in the two-dimensional space indicates ON; each of the regions where the pattern element is not placed so as to form the symbol arrangement pattern among the plurality of regions in the two-dimensional space indicates OFF; and linked information that is different from the message is linked to binary information specified by the regions indicating ON and the regions indicating OFF; a step of storing, in a storing medium of a reading apparatus, a combined information, which includes a combination of text information that indicates the message in the visual code generated by the visual code generating apparatus and the linked information, or a combination of the binary information and the linked information; a step of reading the visual code from an article after the article having the visual code is put at a place that can be seen by a human; and a step of specifying the linked information corresponding to the visual code read by the reading apparatus on the basis of the combined information stored in the storing medium of the reading apparatus, and outputting the specified linked information from the reading apparatus.

Effects of Invention

According to the present invention, it is possible to visually and directly convey a message to a human, and to accurately and indirectly convey information by using an apparatus having an optical reading function such as a scanner, and therefore, it is possible to improve the function of conveying information.

BRIEF DESCRIPTION OF DRAWINGS

FIG. 7 is an explanatory diagram showing combined information in a visual code according to an embodiment of the present invention.

FIG. 8 is an explanatory diagram showing an electronic circuit board to which a visual code according to an embodiment of the present invention is attached.

DETAILED DESCRIPTION

Figure 1:
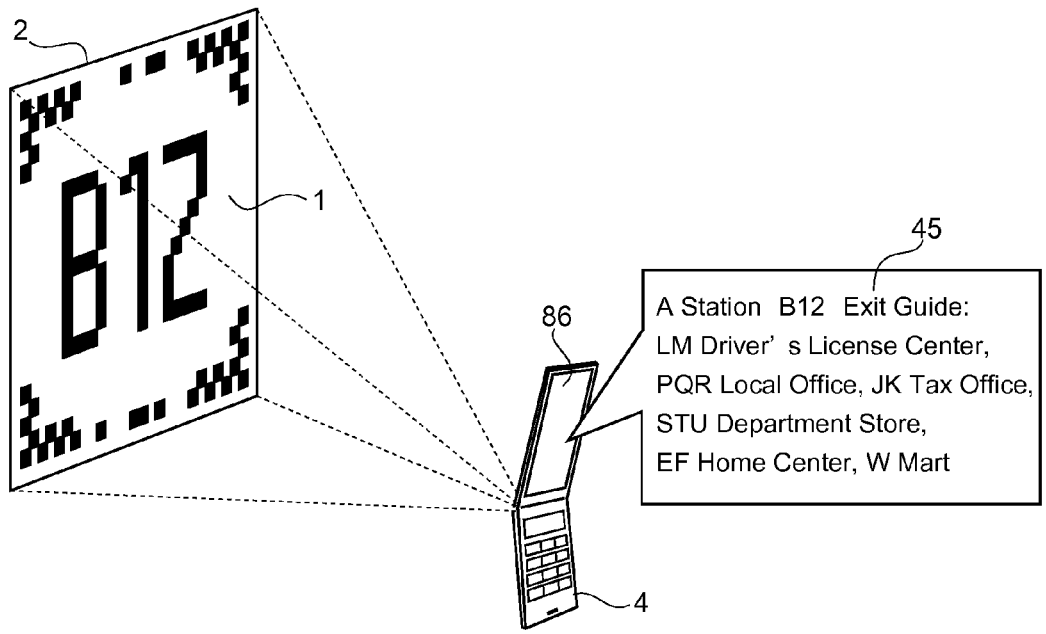
FIG. 1 is an explanatory diagram showing the outline of the information conveyance by an article having a visual code according to an embodiment of the present invention.

Embodiments of the present invention will be described below, referring to the drawings.

(Outline of Information Conveyance) FIG. 1 shows the outline of the information conveyance by an article having a visual code according to an embodiment of the present invention. In FIG. 1, information conveyance is carried out by an article having a visual code 1 according to an embodiment of the present invention as follows.

First, the visual code 1 is generated by a visual code generating apparatus. The visual code 1 is a code formed by making a link between a symbol arrangement pattern, which can be visually recognized as a message by a human and can be recognized by an apparatus with an optical reading function, and linked information 45 that is different from the message. In the example shown in FIG. 1, the symbol arrangement pattern in the visual code 1 expresses "B12" as a message. This message B12 indicates a subway exit number. Also, in the example shown in FIG. 1, the linked information 45 expresses "A station B12 exit guide: LM Driver's License Center, PQR local office, . . . ", and this indicates that it is convenient to take the exit numbed B12 to head toward the facilities listed in it.

Next, combined information generated by the visual code generating apparatus is sent to a visual code reading apparatus 4, which is an apparatus with an optical reading function, and is stored in a storage unit of the visual code reading apparatus 4. The combined information is generated by the visual code generating apparatus in the process of the generation of the visual code 1. The combined information includes a symbol parameter, which are binary information generated by binarizing the symbol arrangement pattern in the visual code 1, and linked information 45. Incidentally, in the example shown in FIG. 1, the visual code reading apparatus 4 is a mobile phone with a built-in camera.

Next, the visual code 1 generated by the visual code generating apparatus is attached to or printed on an article. The article to which the visual code 1 is attached is placed in a place where people can see the article with their eyes. In the example shown in FIG. 1, an information board 2 corresponds to an article. In this case, the visual code 1 is printed on the information board 2, and the information board 2 on which the visual code 1 is printed is set up near the subway exit numbered B12.

Next, a visual code 1 attached to or printed on the article placed in the place where people can see the article with their eyes is read by the visual code reading apparatus 4. For instance, a user of the subway station takes a picture of the visual code 1 printed on the information board 2 with the visual code reading apparatus 4 to have the visual code reading apparatus 4 read the visual code 1. The visual code reading apparatus 4 specifies the linked information 45 corresponding to the read visual code 1 on the basis of the combined information stored in the storing unit of the visual code reading apparatus 4, and displays the specified linked information 45 in a display unit 86 of the visual code reading apparatus 4. For instance, the user of the subway station can see the linked information 45, namely, the guide information about the exit numbered B12, displayed in the display unit 86, and can decide whether or not to take the exit numbered B12.

Thus, according to the information board 2 on which the visual code 1 is printed, it is possible to visually and directly convey a message ("B12"), and it is possible to accurately and indirectly convey information (the linked information 45: the guide information about the exit numbered B12) through the visual code reading apparatus 4.

Figure 2:
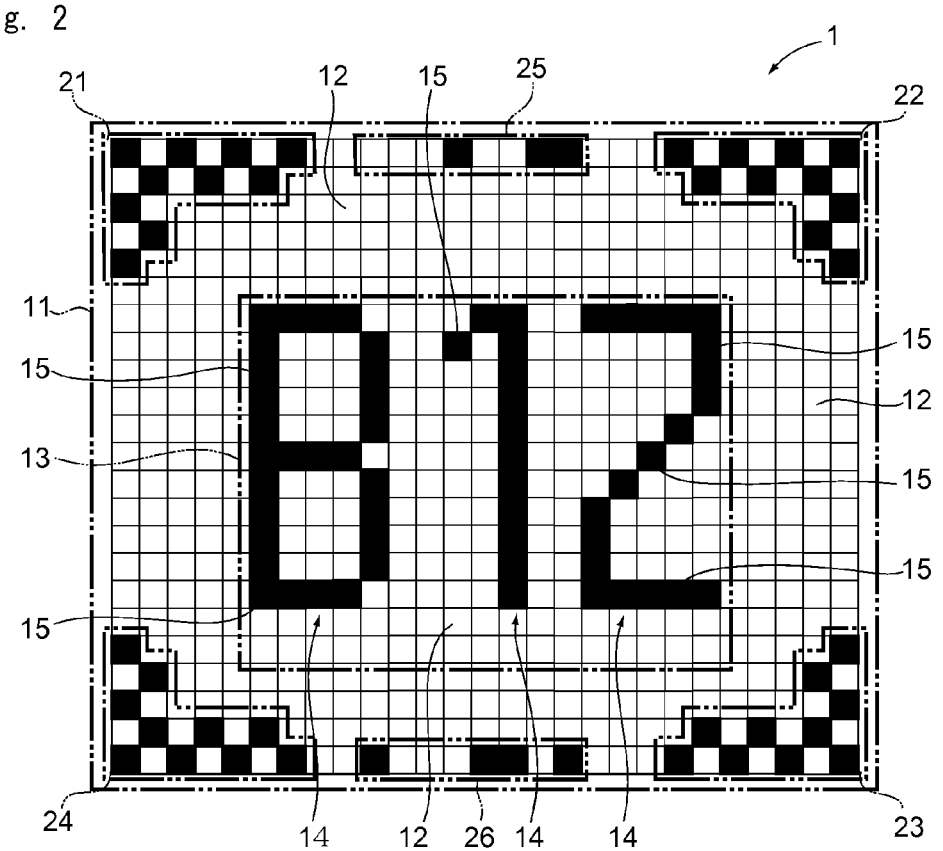
FIG. 2 is an explanatory diagram showing the constitution in appearance of a visual code according to an embodiment of the present invention.

(Constitution of Visual Code) FIG. 2 shows the constitution in appearance of the visual code 1. As mentioned above, the visual code 1 is a code formed by making a link between the symbol arrangement pattern, which can be visually recognized as a message by a human and can be recognized by an apparatus with an optical reading function, and the linked information 45 that is different from the message. More specifically, as shown in FIG. 2, the visual code 1 is a code wherein a symbol arrangement pattern 13, which indicates a message that can be visually recognized by a human, is formed by forming a code space 11 by arranging multiple regions 12 in a form like a grid, selecting one or more than one region 12 from among the multiple regions 12, and placing a pattern element 15 with a predetermined shape in each of the selected regions 12; each of the regions 12 where the pattern element 15 is placed so as to form the symbol arrangement pattern 13 among the multiple regions 12 in the code space 11 indicates ON; each of the regions 12 where the pattern element 15 is not placed so as to form the symbol arrangement pattern 13 among the multiple regions 12 in the code space 11 indicates OFF; and linked information 45 that is different from the message is linked to binary information specified by these ONs and OFFs.

Namely, the code space 11 is a two-dimensional space expanding in a longitudinal direction and a lateral direction, and the outer shape of the code space 11 is a quadrilateral. The regions 12, each of which has a square shape for instance, are closely arranged in the code space 11, in a longitudinal direction and a lateral direction, in such a manner as to form a grid.

Also, the symbol arrangement pattern 13 is placed in the central area of the code space 11. The symbol arrangement pattern 13 is formed of a single symbol pattern 14 or the array of multiple symbol patterns 14, and expresses a message (for instance, "B12") that can be visually recognized by a human.

Five lines can be formed in the code space 11, and up to twelve symbol patterns 14 can be arranged each of the lines, and thus, the symbol arrangement pattern 13 composed of up to sixty symbol patterns 14 can be formed. Incidentally, the visual code 1 may be formed by arranging one symbol pattern 14 in the code space 11. Also, the maximum number of symbol patterns 14 that can be arranged in the code space 11 to form the symbol arrangement pattern 13, the maximum number of symbol patterns 14 for each line, and the number of lines are not limited.

Further, control patterns, which are mainly for controlling the visual code reading apparatus 4, are placed in the circumferential area of the code space 11. The control patterns include guide patterns 21, 22 and 23, an expansion pattern 24, an arrangement information pattern 25, and a discriminating information pattern 26. Incidentally, the control patterns are not what indicate a message that can be visually recognized by a human.

Figure 3:
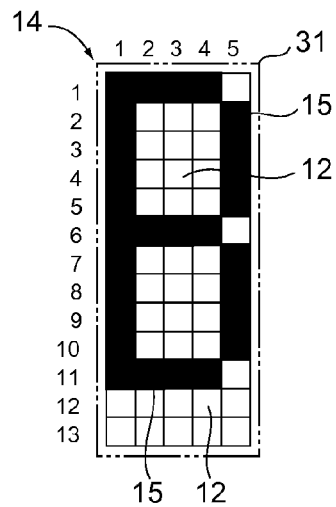
FIG. 3 is an explanatory diagram showing the constitution of a symbol pattern forming a symbol arrangement pattern in a visual code according to an embodiment of the present invention.
Figure 4:
FIG. 4 is an explanatory diagram showing examples of symbol patterns in a visual code according to an embodiment of the present invention.

(Constitution and Type of Symbol Pattern) FIG. 3 shows the constitution of the symbol pattern 14 for forming the symbol arrangement pattern 13 in the visual code 1. FIG. 4 shows various examples of the symbol pattern 14. As show in FIG. 3, each of the symbol patterns 14 forming the symbol arrangement pattern 13 is formed in a symbol pattern area 31, and the symbol pattern area 31 is formed of a total of sixty-five regions 12, in which the thirteen regions 12 are arranged in a longitudinal direction, and the five regions 12 are arranged in a lateral direction. The symbol pattern 14 is formed by selecting one or more than one region 12 from among the sixty-five regions 12 in the symbol pattern area 31, and placing the pattern element 15 in each of the selected regions 12 in such a way as to form the shape of the symbol pattern 14. Each of the pattern elements 15 has approximately the same shape and size as those of the region 12.

As shown in FIG. 4, the symbol patterns 14 that express numbers (0 to 9), alphabets (A to Z, and a to z), and other symbols ("!", """, "#", "$", "%", "&", "'", "(",")", . . . ), respectively, can be formed by appropriately placing the pattern elements 15 in any of the sixty-five regions 12 forming the symbol pattern area 31. Thus, according to a visual code 1, it is possible to express all the symbols (JIS codes No. 32 to 126) that a person can directly input by typing the keyboard of a personal computer and that can be displayed in a monitor. Further, it is possible to express symbols other than these by using the symbol pattern 14.

Figure 5:
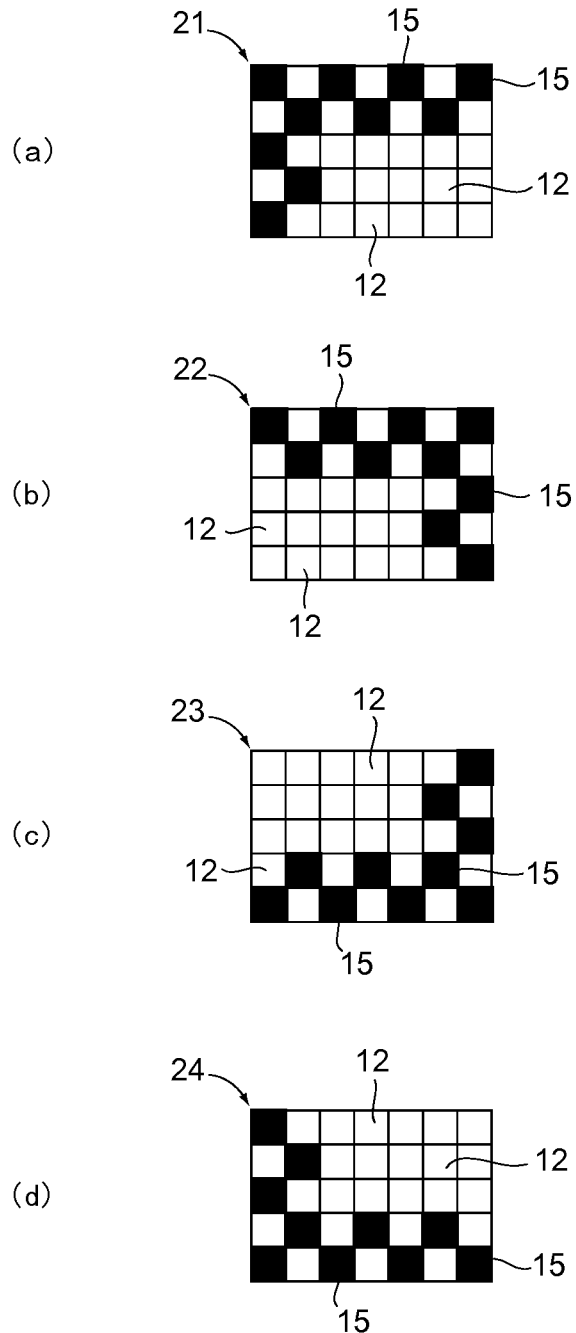
FIG. 5 is an explanatory diagram showing guide patterns and an expansion pattern in a visual code according to an embodiment of the present invention.

(Guide Pattern and Expansion Pattern) FIG. 5 shows the guide patterns 21, 22 and 23, and the expansion pattern 24. The guide patterns 21, 22 and 23 are patterns for correcting a misalignment between the visual code reading apparatus 4 and the visual code 1, or enabling the visual code reading apparatus 4 to recognize a reading direction of the visual code 1, when the visual code reading apparatus 4 reads the visual code 1. As shown in FIG. 5(a), the guide pattern 21 is formed by selecting one or more than one region 12 from among the multiple regions 12 located in a predetermined area in the code space 11, and placing the pattern element 15 in each of the selected regions 12 in such a way as to form the shape of the guide pattern 21. Each of the guide patterns 22 and 23 is formed by a similar way to that of the guide pattern 21. As show in FIG. 5(a), (b) and (c), each of the guide patterns 21, 22 and 23 has a unique form (shape). Namely, the forms of the guide patterns 21, 22 and 23 are different from each other, the form of each of the guide patterns 21, 22 and 23 is different from the form of any one of the other control patterns, and the form of each of the guide patterns 21, 22 and 23 is different from the form of any one of the symbol patterns 14. Further, as shown in FIG. 2, the guide pattern 21 is placed at the upper-left corner part of the code space 11, the guide pattern 22 is placed at the upper-right corner part of the code space 11, and the guide pattern 23 is placed at the lower-right corner part of the code space 11.

In the case where the outer shape of the area in which the symbol arrangement pattern 13 is placed is a rectangle or a square, it is possible to recognize the outer shape of the area by recognizing the positions of three vertices among the four vertices of the area. Therefore, the visual code reading apparatus 4 can recognize the outer shape of the symbol arrangement pattern 13 according to the guide patterns 21, 22 and 23.

The line connecting between the guide pattern 21 and the guide pattern 22 is parallel to the lateral direction of the symbol arrangement pattern 13. Therefore, the visual code reading apparatus 4 can recognize the lateral reading direction of the symbol arrangement pattern 13 according to the guide patterns 21 and 22. Also, the line connecting the guide pattern 22 and the guide pattern 23 is parallel to the longitudinal direction of the symbol arrangement pattern 13. Therefore, the visual code reading apparatus 4 can recognize the longitudinal reading direction of the symbol arrangement pattern 13 according to the guide patterns 22 and 23.

Further, the guide pattern 21 is located on the leftmost side of the symbol arrangement pattern 13. Therefore, the visual code reading apparatus 4 can recognize the reading start position of the symbol arrangement pattern 13 according to the guide pattern 21. Also, the guide patterns 22 and 23 are located on the rightmost side of the symbol arrangement pattern 13. Therefore, the visual code reading apparatus 4 can recognize the reading end position of the symbol arrangement pattern 13 according to the guide pattern 22 or the guide pattern 23. Further, in the case where the number of lines of the symbol arrangement pattern 13 is two or more than two, the visual code reading apparatus 4 can recognize the first line of the symbol arrangement pattern 13 according to the guide pattern 21 or the guide pattern 22, and can recognize the bottom line of the symbol arrangement pattern 13 according to the guide pattern 23. Incidentally, the forms (or shapes) of the guide patterns 21, 22 and 23 are not limited to the forms shown in FIG. 5(a), (b) and (c).

The expansion pattern 24 has a unique form, as shown in FIG. 5(d), for instance, and the expansion pattern 24 is placed at the lower-left corner part of the code space 11, as shown in FIG. 2. A unique function or unique information can be assigned to the expansion pattern 24 by utilizing a unique form of the expansion pattern 24 or a unique position of the expansion pattern 24 in the code space 11. For instance, the forms of the expansion patterns 24 can be changed depending on articles to which the visual codes 1 are attached, and multiple pieces of information that are different from each other may be assigned to the expansion patterns 24 that have different forms depending on articles to which the visual codes 1 are attached, respectively. Also, functions that help the visual code reading apparatus 4 to correct a misalignment or to recognize a reading direction according to the guide patterns 21, 22 and 23 may be given to the expansion pattern 24 by utilizing, for instance, the fact that the expansion pattern 24 is located at the lower-right corner part of the code space 11.

Figure 6:
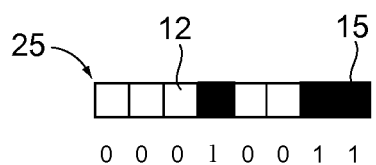
FIG. 6 is an explanatory diagram showing an arrangement information pattern in a visual code according to an embodiment of the present invention.

(Arrangement Information Pattern) FIG. 6 shows an arrangement information pattern 25. The arrangement information pattern 25 is a pattern that indicates the number of columns and the number of rows (or lines) of the arrangement of the symbol patterns 14 forming the symbol arrangement pattern 13 in the visual code 1. The arrangement information pattern 25 is placed in the top-central part of the code space 11 (see FIG. 2). The arrangement information pattern 25 is formed by placing the pattern elements 15 in eight regions 12 continuously arranged in a lateral direction in such a way as to express eight-bit binary information that indicates the number of columns and the number of rows of the arrangement of the symbol patterns 14 forming the symbol arrangement pattern 13. For instance, among the eight bits of the binary information, the set of the lower four bits indicates the number of columns, and the set of the upper four bits indicates the number of rows.

For instance, the symbol arrangement pattern 13 shown in FIG. 2 is formed by arranging the three symbol patterns 14 representing "B", "1" and "2", in a row. Thus, the number of columns of the symbol arrangement pattern 13 is three, and the number of rows of the symbol arrangement pattern 13 is one. In this case, the eight-bit binary information expressed by the arrangement information pattern 25 is "00010011", which corresponds to the arrangement information pattern 25 shown FIG. 6.

Incidentally, the arrangement or the form of the arrangement information pattern 25 is not limited to the arrangement or the form shown in FIG. 6. For instance, the arrangement information pattern 25 may be placed in the bottom-central part, the lowermost-central part, or the rightmost-central part. Also, for instance, the arrangement information pattern 25 may be formed of sixteen regions 12 continuously arranged in a lateral or longitudinal direction so as to express sixteen-bit binary information. Alternatively, the arrangement information pattern 25 may be designed so as to indicate the number of symbol patterns 14 forming the symbol arrangement pattern 13.

(Discriminating Information Pattern) As shown in FIG. 2, a discriminating information pattern 26, which is paced in the bottom-center part of the code space 11, is a pattern for discriminating multiple pieces of linked information 45 linked to the symbol arrangement pattern 13 in the visual code 1. As mentioned below, the multiple pieces of linked information 45 that are different from each other can be linked to the symbol arrangement pattern 13 in the visual code 1. In the case where the multiple pieces of linked information 45 are linked to the symbol arrangement pattern 13, the visual code reading apparatus 4 can recognize one piece of specific linked information 45 among the multiple pieces of linked information 45 linked to the symbol arrangement pattern 13 according to the discriminating information pattern 26. The discriminating information pattern 26 is formed by placing the pattern elements 15 in eight regions 12 continuously arranged in a lateral direction in such a way as to express eight-bit binary information that indicates the discrimination number (a linked information discrimination number 44) of the linked information 45 linked to the symbol arrangement pattern 13.

Incidentally, the arrangement or the form of the discriminating information pattern 26 is not limited to the arrangement or the form shown in FIG. 2. For instance, the discriminating information pattern 26 may be placed in the top-center part, the leftmost-center part, or the rightmost-center part of the code space 11. Also, for instance, the discriminating information pattern 25 may be formed of sixteen regions 12 continuously arranged in a lateral or longitudinal direction so as to express sixteen-bit binary information.

(Combined Information) FIG. 7 shows the combined information in the visual code 1. Combined information 41 mainly is information that indicates the correspondence relationship between the symbol arrangement pattern 13 and the linked information 45 linked to this symbol arrangement pattern 13 in the visual code 1. The combined information 41 is generated by the visual code generating apparatus in the process of generating the visual code 1, and thereafter, the combined information 41 is sent from the visual code generating apparatus to the visual code reading apparatus 4, and then is stored to the storing unit of the visual code reading apparatus 4. When the visual code reading apparatus 4 reads the visual code 1 attached to or printed on an article and displays the linked information 45 corresponding to this visual code 1 in the display unit 86, the visual code reading apparatus 4 refers to the combined information 4 and specifies the linked information 45 corresponding to the read visual code 1.

As shown in FIG. 7, the combined information 41 includes message text information 42, a symbol parameter 43, the linked information discrimination number 44 and the linked information 45.

The message text information 42 is text data of the message expressed by the symbol arrangement pattern 13 in the visual code 1. For instance, the message expressed by the symbol arrangement pattern 13 in the visual code 1 shown in FIG. 2 is "B12", and, in this case, the message text information 42 represents "B12", as shown in FIG. 7.

The symbol parameter 43 is binary information generated by binarizing the symbol arrangement pattern 13 in the visual code 1. Namely, each of the regions 12 where the pattern element 15 is placed so as to form the symbol arrangement pattern 13 among the multiple regions 12 in the code space 11 indicates ON, and each of the regions 12 where the pattern element 15 is not placed so as to form the symbol arrangement pattern 13 among the multiple regions 12 in the code space 11 indicates OFF, and the symbol parameter 43 is the binary information specified by the regions 12 indicating ON and the regions 12 indicating OFF.

The symbol parameter 43 is generated by generating multiple pieces of binary information obtained by binarizing the respective symbol patterns 14 forming the symbol arrangement pattern 13, and connecting these multiple pieces of binary information according to the order of the symbol patterns 14 of the symbol arrangement pattern 13. Assuming that "x" indicates a column number, "y" indicates a row number, and "(x, y)" indicates the position of a region 12 in the symbol pattern area 31 shown in FIG. 3, the binary information of a symbol pattern 14 is generated by assigning "1" or "0" to each region 12 in the symbol pattern area 31, depending on whether the region 12 indicates ON or OFF, in the order of (1, 1), (2, 1), (3, 1), (4, 1), (5, 1), (1, 2), (2, 2), . . . , (4, 12), (5, 12), (1, 13), (2, 13), (3, 13), (4, 13), (5, 13). For instance, as shown in FIG. 3, the binary information that indicates "B" represents as follows:

"11110100011000110001100011110100011000110001 1000111110". The symbol parameter 43 shown in FIG. 7 corresponds to the symbol arrangement pattern 13 that expresses "B12" shown in FIG. 12. Incidentally, the way of binarizing the symbol arrangement pattern 13 is not limited to the way mentioned above.

The linked information discrimination number 44 is a number for discriminating each one of the multiple pieces of linked information 45, in the case where the multiple pieces of linked information 45 are linked to the symbol arrangement pattern 13. The linked information discrimination number 44 is a unique number that is different from another linked information discrimination number 44. Incidentally, in the example shown in FIG. 7, each linked information discrimination number 44 is expressed as a binary number, since the discriminating information pattern 26 indicating the linked information discrimination number 44 is a pattern expressing eight-bit binary information.

The linked information 45 is information linked to the symbol arrangement pattern 13 in the visual code 1. To be precise, considering the constitution of the combined information 41, the linked information 45 is information combined to the symbol parameter 43 (or the message text information 42). Multiple pieces of linked information 45 can be linked to one symbol arrangement pattern 13. The linked information 45 shown in FIG. 7 is text data; however, the linked information 45 may be sound data, image data, moving image data, computer programs, etc.

Figure 9:
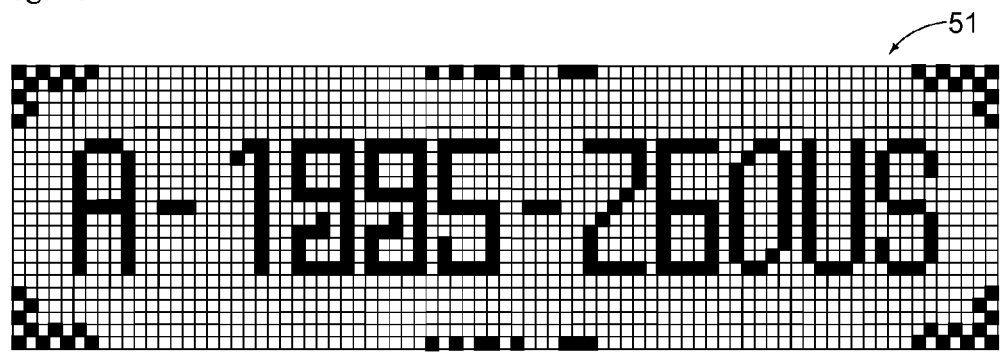
FIG. 9 is an explanatory diagram showing the visual code attached to the electronic circuit board shown in FIG. 8.

(Other Examples of Articles with Visual Code) FIG. 8 shows an electronic circuit board, which is another example of an article to which a visual code is attached. FIG. 9 shows an example of the visual code attached to the electronic circuit board shown in FIG. 8. In FIG. 8, an electronic circuit board 52 is a component of an electronic apparatus, for instance, a personal computer. A symbol arrangement pattern in a visual code 51 indicates the component number of the electronic circuit board 52. For instance, the symbol arrangement pattern in the visual code 51 expresses "A-1995-260US", as shown in FIG. 9. Among this, "A" indicates the manufacturing factory of the electronic circuit board 52, "1995" indicates the manufacturing year of the electronic circuit board 52, "260" indicates the lot number of the electronic circuit board 52, and "US" indicates the country that the specification of the electronic circuit board 52 matches. Further, the linked information linked to the symbol arrangement pattern in the visual code 51 is information that specifically describes the specification of the electronic circuit board 52.

A factory worker of the factory of the electronic apparatus can immediately recognize the manufacturing factory, the manufacturing year, the lot number and the country that the specification matches by seeing the visual code 51, when the factory worker inspects the electronic circuit board 52. Also, the factory worker can specifically recognize the specification of the electronic circuit board 52 by reading the visual code 51 with the visual code reading apparatus.

Thus, according to the electronic circuit board 52 to which the visual code 51 is attached, it is possible to visually convey the information on the electronic circuit board 52 that a factory worker immediately wants to know, to the factory worker, and also, it is possible to convey more specific information on the electronic circuit board 52 to the factory worker through the visual code reading apparatus.

Figure 10:
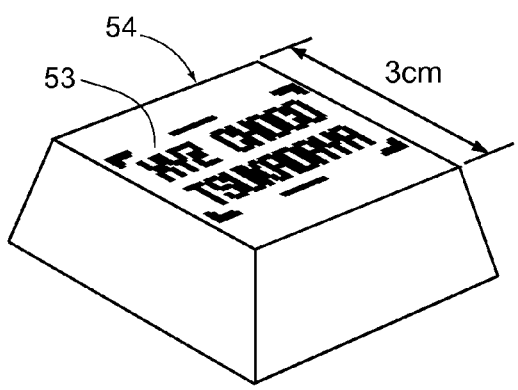
FIG. 10 is an explanatory diagram showing a chocolate candy to which a visual code according to an embodiment of the present invention is attached.
Figure 11:
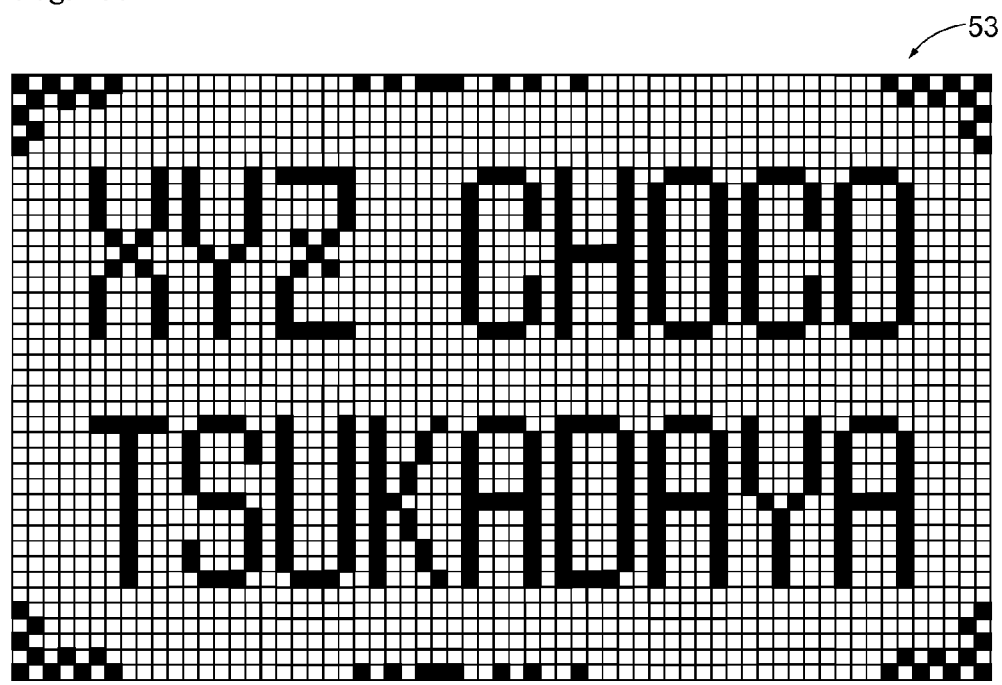
FIG. 11 is an explanatory diagram showing the visual code attached to the chocolate candy shown in FIG. 10.

FIG. 10 shows a small packaged chocolate candy as another example of an article to which a visual code is attached. FIG. 11 shows an example of the visual code attached to the package of the chocolate candy shown in FIG. 10. In FIG. 10, a chocolate candy 54 that a visual code 53 is attached to (or printed on) the package thereof is a small chocolate candy, and, in the chocolate candy 54, the part that messages can be attached is only the part of the package shaped like a square with three centimeters on a side on the front face of the chocolate candy 54. The visual code 53 is attached to this small part. In the symbol arrangement pattern in the visual code 53, as shown in FIG. 11, the name of the chocolate candy 54 "XYZ CHOCO" is arranged in the first line, and the name of the manufacturer of the chocolate candy 54 is arranged in the second line. The linked information linked to the symbol arrangement pattern in the visual code 53 is information that indicates the ingredients of the chocolate candy 54, the caloric value of the chocolate candy 54, and so on.

A consumer can immediately recognize the name of the chocolate candy 54 and the name of the manufacturer of the chocolate candy 54 by picking up the chocolate candy 54 displayed in a shop and seeing the visual code 53. Further, the consumer can recognize the ingredients of the chocolate candy 54 and the caloric value of the chocolate candy 54 and so on by reading the visual code 53 with the visual code reading apparatus.

Thus, according to the chocolate candy 54 to which the visual code 53 is attached, it is possible to visually and immediately convey the brief information about the chocolate candy 54 to a consumer, and it is possible to convey the specific information about the chocolate candy 54 to the consumer through the visual code reading apparatus.

Since the symbol arrangement pattern in the visual code 53 indicates a message, attaching the visual code 53 to the package of the chocolate candy 54 does not make the whole design of the packaged chocolate candy 54 worse, compared to the case where a conventional barcode or two-dimensional code is attached.

Also, since the symbol arrangement pattern in the visual code 53 indicates the name of the chocolate candy 54 and the name of the manufacturer of the chocolate candy 54, the visual code 53 can be attached to a noticeable part of the chocolate candy 54, such as the front face, the central part, etc. of the chocolate candy 54.

Further, in the chocolate candy 54, the part that messages can be attached is very small, and therefore, if the name of the chocolate candy 54 and the name of the manufacturer of the chocolate candy 54 are printed in this part, other messages cannot be printed in this part any more. Therefore, a conventional barcode or two-dimensional code cannot be attached to the chocolate candy 54. However, the visual code indicates the name of the chocolate candy 54 and the name of the manufacturer of the chocolate candy 54 in itself, and therefore, the visual code 53 can be attached to or printed on such a small part of the chocolate candy 54.

Figure 12:
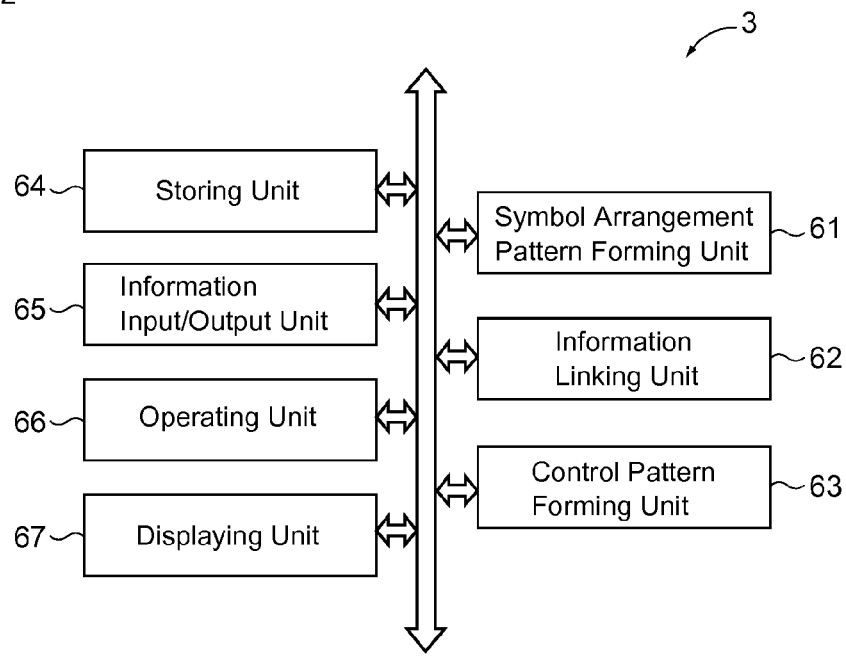
FIG. 12 is a block diagram showing a visual code generating apparatus according to an embodiment of the present invention.
Figure 13:
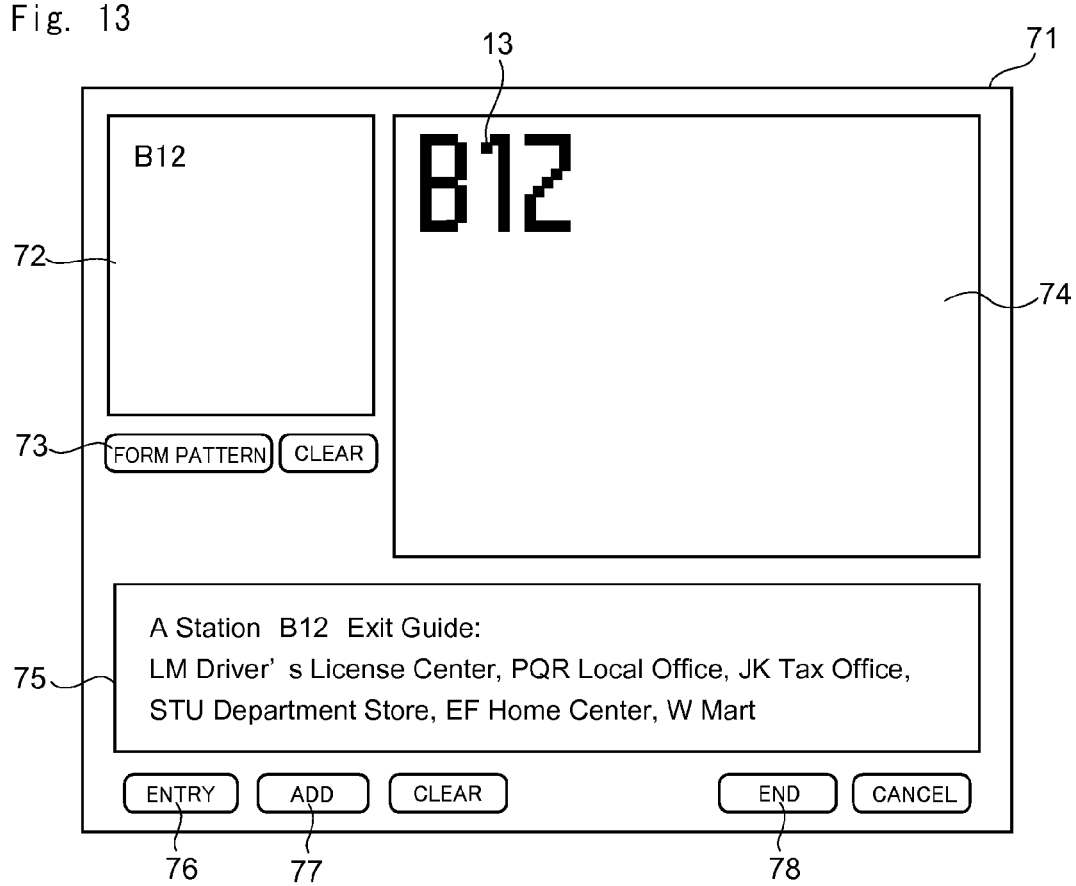
FIG. 13 is an explanatory diagram showing a visual code generating screen of a visual code generating apparatus according to an embodiment of the present invention.

(Visual Code Generating Apparatus) FIG. 12 shows the constitution of the visual code generating apparatus. FIG. 13 shows a visual code generating screen displayed in the display unit of the visual code generating apparatus.

In FIG. 12, a visual code generating apparatus 3 is an apparatus for generating the visual code 1, and can be realized by using a personal computer or the like. The visual code generating apparatus 3 comprises a symbol arrangement pattern forming unit 61, an information linking unit 62, a control pattern forming unit 63, a storing unit 64, an information output/input unit 65, an operating unit 66, and a display unit 67.

The symbol arrangement pattern forming unit 61 forms the symbol arrangement pattern 13 in the visual code 1. The information linking unit 62 links the linked information 45 to the symbol arrangement pattern 13. The control pattern forming unit 63 forms the control pattern, that is, the guide patterns 21, 22, 23, the expansion pattern 24, the arrangement information pattern 25, and the discriminating information pattern 26. The symbol arrangement pattern forming unit 61, the information linking unit 62 and the control pattern forming unit 63 are realized by having a personal computer read computer programs for realizing the functions of those units and having the CPU (Central Processing Unit) of the personal computer execute the computer programs.

The storing unit 64 is a storing medium or a storing unit, such as a RAM (Random Access Memory), a flash memory, a hard disk drive, and can be realized by using a device that a personal computer has in general. The binary information formed by binarizing each of the symbol patterns 14, as show in FIG. 4, according to the abovementioned way is stored in the storing unit 64. Also, the combined information 41 is stored in the storing unit 64 in the process of the visual code 1.

The information input/output unit 65 is an interface for sending information to and receiving information from an external memory device, such as a USB (Universal Serial Bus) memory, a memory card, that is connected; a LAN (Local Area Network) interface for sending information to and receiving information from other apparatuses by using a LAN; an optical disk drive; or the like. The information input/output unit 65 can be realized by using a device that a personal computer has in general. The information input/output unit 65 outputs the generated visual code 1 and the combined information 41.

The operating unit 66 is, for instance, a keyboard, a mouse, and so on; and the display unit 67 is, for instance, a liquid crystal display. These can be realized by using devices that a personal computer has in general.

The visual code generating apparatus 3 having such a constitution operates as follows. A user starts up the visual code generating apparatus 3. (For instance, the user turns on the power switch of a personal computer, and starts a program for realizing the visual code generating apparatus 3 after the operation system is booted up.) Then, as shown in FIG. 13, a visual code generating screen 71 is displayed in the display unit 67. The visual code generating screen 71 is a screen for providing the user with information to generate the visual code 1 by using the visual code generating apparatus 3.

After the visual code generating screen 71 is displayed, the user performs operations to generate the symbol arrangement pattern 13 in the visual code 1. More specifically, the user operates the operating unit 66, and inputs the text data representing a message (for instance, "B12") that the user wants to visually convey with the visual code 1, into a message input area 72 in the visual code generating screen 71, and thereafter, the user presses (clicks with the mouse) a pattern forming button 73.

In response to this, the symbol arrangement pattern forming unit 61 selects the binary information of the symbol patterns 14 corresponding to the text data input in the message input area 72 for each of the symbols forming the text data (for instance, "B", "1", and "2") from among the binary information of the symbol patterns 14 stored in the storing unit 64, and next converts the selected binary information of the symbol patterns 14 into the symbol patterns 14, and then displays the symbol patterns 14 in a symbol arrangement pattern displaying area 74 of the visual code generating screen 71. Thus, the symbol arrangement pattern 13 corresponding to the text data that the user inputs into the message input area 72 is displayed in the symbol arrangement pattern displaying area 74.

Next, the user performs operations to generate the linked information 45 to be attached to the symbol arrangement pattern 13. More specifically, the user operates the operating unit 66, and inputs the text data representing information (for instance, "A station B12 exit guide: LM Driver's License Center, . . . ") that the user wants to convey by reading the visual code with the visual code reading apparatus 4, into a linked information input area 75 of the visual code generating screen 71, and thereafter, the user presses an entry button 76.

In response to this, the information linking unit 62 links the linked information 45 corresponding to the text data input into the linked information input area 75, to the symbol arrangement pattern 13 that is currently displayed in the symbol arrangement pattern displaying area 74. More specifically, the information linking unit 62 generates the combined information 41 (see FIG. 7) by combining the message text information 42 corresponding to the text data input into the message input area 72, the symbol parameter 43 corresponding to the symbol arrangement pattern 13 displayed in the symbol arrangement pattern displaying area 74, the linked information discrimination number 44 that indicates the linked information 45 that is firstly linked, and the linked information 45 corresponding to the text data input into the linked information input area 75; and then, the information linking unit 62 stores this combined information 41 in the storing unit 64.

Next, if there is further information that the user wants to convey by reading the visual code 1 with the visual code reading apparatus 4, the user presses an addition button 77. In response to this, the linked information input area 75 is cleared. Thereafter, the user can additionally input the information that the user wants to convey by reading the visual code 1 with the visual code reading apparatus 4, into the linked information input area 75, and can press the entry button 76. If the user does so, the information linking unit 62 adds the linked information discrimination number 44 that indicates the linked information 45 that is secondly linked, and the linked information 45 corresponding to the text data that is additionally input into the linked information input area 75 at this time, to the combined information 41 that was generated immediately before this and has been already stored in the storing unit 64.

After the operations for generating the linked information 45 to be linked to the symbol arrangement pattern 13 is ended, the user presses an end button 78. In response to this, the symbol arrangement pattern forming unit 61 and the control pattern forming unit 63 generate the whole pattern (Hereinafter, it is referred to as a "visual code pattern".) that forms the visual appearance of the visual code 1. More specifically, the symbol arrangement pattern forming unit 61 generates the code space 11 having the size that matches the symbol arrangement pattern 13 that is currently displayed in the symbol arrangement pattern displaying area 74, and then, the symbol arrangement pattern forming unit 61 places the symbol arrangement pattern 13 in the code space 11. Also, the control pattern forming unit 63 places the guide patterns 21, 22, 23 and the expansion pattern 24 in the corner parts of the generated code space 11, respectively. The control pattern forming unit 63 further generates the arrangement information pattern 25 that indicates the number of columns and the number of rows of the symbol arrangement pattern 13 that is currently displayed in the symbol arrangement pattern displaying area 74, and places the arrangement information pattern 25 in the top-central part of the generated code space 11. Furthermore, the control pattern forming unit 63 generates the discriminating information pattern 26 that indicates the discrimination number of the linked information 45 that is firstly lined to the symbol arrangement pattern 13, and places the discriminating information pattern 26 in the bottom-central part of the generated code space 11.

Moreover, in the case where the multiple pieces of linked information 45 are linked to the symbol arrangement pattern 13, the symbol arrangement pattern forming unit 61 and the control pattern forming unit 63 generate the multiple visual code patterns depending on the number of pieces of linked information 45 linked to the symbol arrangement pattern 13. In this process, the control pattern forming unit 63 generates the discriminating information patterns 26 different for each visual code pattern.

Thus, the visual code pattern(s) generated by the symbol arrangement pattern forming unit 61 and the control pattern forming unit 63 is (are) stored in the storing unit 64.

Thereafter, the user can output the visual code pattern and the combined information 41 stored in the storing unit 64, from the visual code generating apparatus 3 to an external apparatus through the information input/output unit 65. The user performs operations to attach the visual code 1 to an article by using the visual code pattern output from the visual code generating apparatus 3. Also, the user performs operations for transferring or inputting the combined information 41 output from the visual code generating apparatus 3, to the visual code reading apparatus 4, and storing the combined information 41 in the storing device of the visual code reading apparatus 4.

Figure 14:
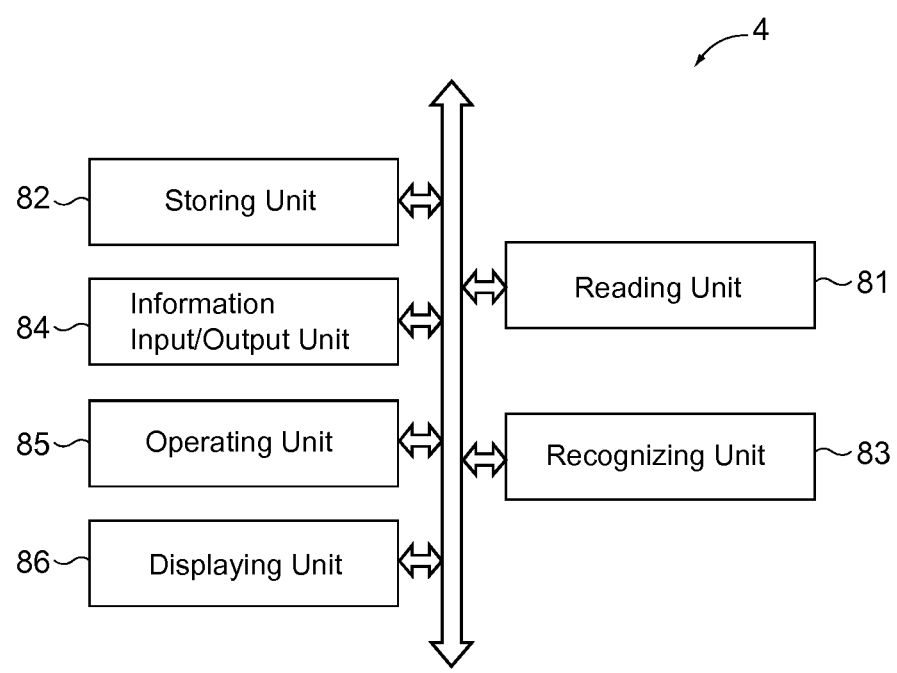
FIG. 14 is a block diagram showing a visual code reading apparatus according to an embodiment of the present invention.

(Visual Code Reading Apparatus) FIG. 14 shows the constitution of the visual code reading apparatus 4. In FIG. 14, the visual code reading apparatus 4 is an apparatus for reading the visual code 1 attached to or printed on an article, and the visual code reading apparatus 4 can be realized by, for instance, a code reader, a terminal device such as a mobile phone, or the like. The visual code reading device 4 comprises a reading unit 81, a storing unit 82, a recognizing unit 83, an information input/output unit 84, an operating unit 85, and a display unit 86.

The reading unit 81 is, for instance, a scanner, a camera, or the like. The reading unit 81 optically reads the visual code 1 attached to or printed on an article. The reading unit 81 can read the visual code 1 attached to or printed on an article from a position apart from the article.

The storing unit 82 comprises a recording medium such as a RAM or a flash memory. The combined information 41 is stored in the storing unit 82.

The recognizing unit 83 recognizes the symbol arrangement pattern 13 and so on in the visual code 1 read by the reading unit 81, and specifies the linked information 45 linked to the recognized symbol arrangement pattern 13 on the basis of the combined information 41 stored in the storing unit 82. The recognizing unit 83 is realized by having the CPU of the visual code reading apparatus 4 execute computer programs for realizing it.

The information input/output unit 84 is an interface for connecting the visual code reading apparatus 4 to a USB memory, a card memory, etc.; a LAN interface; a communication interface; or the like.

The operating unit 85 has key switches or the like for operating the visual code reading apparatus 4. The display unit 86 is, for instance, a liquid crystal display.

The visual code reading apparatus 4 with such a constitution operates as follows. Before the reading of the visual code 1 with the visual code reading apparatus 4 is started up, the user inputs the combined information 41 generated by the visual code generating apparatus 3 and output from the visual code generating apparatus 3, into the visual code reading apparatus 4 through the information input/output unit 84 of the visual code reading apparatus 4, and then stores the combined information 41 to the storing unit 82 of the visual code reading apparatus 4.

Next, the user points the reading unit 81 of the visual code reading apparatus 4 to the visual code 1 attached to or printed on an article, and then operates the operating unit 85 to have the reading unit 81 start up its reading operation. In response to this, the reading unit 81 optically reads the visual code 1 attached to or printed on an article by taking a picture of the visual code 1 or by scanning the visual code 1.

Next, the recognizing unit 83 recognizes the symbol arrangement pattern 13 and so on in the read visual code 1, and specifies the linked information 45 linked to the recognized symbol arrangement pattern 13. More specifically, the recognizing unit 83 recognizes the guide patterns 21, 22 and 23 in the read visual code 1. The recognizing unit 83 then determines whether or not the reading direction of the visual code 1 is correct, on the basis of the forms and the arrangements of the guide patterns 21, 22 and 23. If the reading direction is not correct, the recognizing unit 83 rotates the visual code pattern (the whole pattern that forms the visual appearance of the visual code 1) of the read visual code 1 so as to correct the direction. The recognizing unit 83 also corrects the misalignment or the deformation of the visual code pattern of the read visual code 1 on the basis of the forms or the arrangements of the guide patterns 21, 22 and 23. Further, the recognizing unit 83 enhances the contrast of the visual code pattern of the read visual code 1, and removes noises. Next, the recognizing unit 83 binarizes the symbol arrangement pattern 13, the expansion pattern 24, the arrangement information pattern 25 and the discriminating information pattern 26. The recognizing unit 83 then cuts out and recognizes the binraized arrangement information pattern 25, and recognizes the number of columns and the number of rows of the symbol arrangement pattern 13 in the read visual code 1. Further, the recognizing unit 83 cuts out each of the binarized symbol patterns 14 from the binaraized symbol arrangement pattern 13 on the basis the recognized number of columns and the recognized number of rows of the symbol arrangement pattern 13, and then generates the symbol parameter 43 by connecting the binarized symbol patterns 14. Furthermore, the recognizing unit 83 cuts out and recognizes the binarized discriminating information pattern 26, and then recognizes the linked information discrimination number 44. The recognizing unit 83, as necessary, cuts out and recognizes the expansion pattern 24 and then performs predetermined processes. Next, the recognizing unit 83 refers to the combined information 41 stored in the storing device 82, and then specifies the linked information 45 combined to the generated symbol parameter 43. If there are the multiple pieces of linked information 45 combined to the generated symbol parameter 43, the recognizing unit 83 selects and specifies one piece of linked information 45 designated by the recognized linked information discrimination number 44 from among the multiple pieces of linked information 45.

Then, the linked information 45 specified by the recognizing unit 83 is displayed in the display unit 86. Thus, the user can visually obtain a message indicated by the symbol arrangement pattern 13 in the visual code 1 attached to or printed on an article, and can obtain the linked information 45 linked to the symbol arrangement pattern 13 by seeing the display unit 86 of the visual code reading apparatus 4.

As described above, according to the visual code 1 (51, 53) of an embodiment of the present invention, it is possible to convey a message that can be visually recognized by a human, and therefore, it is possible to immediately give useful information to people who directly see an article to which the visual code 1 (51, 53) is attached. Also, it is possible to prevent the design of an article from getting worse when the visual code 1 (51, 53) is attached to an article.

Also, since the visual code 1 (51, 53) of an embodiment of the present invention can convey a message that can be visually recognized by a human, it is possible to attach the visual code 1 (51, 53) to various articles without restriction on the ways or forms of the utilization of the articles, compared with a conventional barcode or two-dimensional code that cannot convey any message that can be visually recognized by a human. Therefore, it is possible to improve the flexibility of the visual code 1 (51, 53), and it is possible to expand the range of the utilization of the visual code 1 (51, 53). For instance, as is the case where the visual code 53 is attached to the small chocolate candy 54, the visual code 1 (51, 53) can be attached to a noticeable part of an article, such as the front face or the central part of an article, or can be attached to an article with small surface area.

Further, it is possible to improve the accuracy of the reading and the recognition of the visual code 1 (51, 53) with the visual code reading apparatus 4, by arranging the guide patterns 21, 22 and 23 in the visual code 1 (51, 53).

Furthermore, it is possible to improve the accuracy of the cutting out of each symbol pattern 14 in the process of recognizing the symbol arrangement pattern 13 with the visual code reading apparatus 4, by arranging the arrangement information pattern 25 in the visual code 1 (51, 53). Therefore, it is possible to improve the accuracy of the recognition of the symbol arrangement pattern 13.

Moreover, the multiple pieces of linked information 45 can be linked to the symbol arrangement pattern 13 in the visual code 1 (51, 53). Therefore, it is possible to easily generate the multiple visual codes 1 (51, 53) that have the same symbol arrangement pattern 13 and have different linked information 45. For instance, as show in FIGS. 1 and 7, the linked information 45 that indicates the exit guide to the station A, the linked information 45 that indicates the exit guide to the station B, and the linked information 45 that indicates the exit guide to the station C can be linked to the symbol arrangement pattern 13 that indicates the subway exit number "B12". Therefore, it is possible to easily generate the multiple visual codes 1 (51, 53) that can be attached to the information boards 2 having the same exit number and used for the multiple different subway stations.

Moreover, it is possible to have the visual code reading apparatus 4 easily and accurately select one piece of linked information 45 from among the multiple pieces of linked information 45 that are linked to the symbol arrangement pattern 13, by arranging the discriminating information pattern 26 in the visual code 1 (51, 53).

Moreover, according to the visual code generating apparatus 3 of an embodiment of the present invention, it is possible to easily and efficiently generate the visual code 1 (51, 53) having the abovementioned effects. Also, according to the visual code reading apparatus 4 of an embodiment of the present invention, it is possible to accurately read and recognize the visual code 1 attached to or printed on an article, and it is possible to efficiently specify the linked information 45 linked to the symbol arrangement pattern 13 in the read visual code 1, and provide the linked information 45 for an user.

Incidentally, in the abovementioned embodiment, the outer shape of the code space 11 is a quadrilateral; however, the outer shape of the code space 11 may be formed in another shape. Also, the shape of each region 12 and the shape of each pattern element 15 are not limited to a square.

In the abovementioned embodiment, each symbol pattern 14 is formed in the symbol pattern area 31 composed of the sixty-five regions 12 in which the thirteen regions 12 are arranged in a longitudinal direction and the five regions 12 are arranged in a lateral direction. The present invention is not limited to this. The number of regions forming the symbol pattern area 31 can be decreased or increased. However, according to the constitution wherein each symbol pattern 14 is formed in the symbol pattern area 31 composed of the sixty-five regions 12 in which the thirteen regions 12 are arranged in a longitudinal direction and the five regions 12 are arranged in a lateral direction, it is possible to form the symbol patterns 14 corresponding to all of the symbols (JIS code No. 32 to 126) that can be directly input by typing the keyboard of a personal computer and can be displayed in a monitor, by using the minimum number of regions 12. Therefore, it is possible to simplify the recognition process and to improve the recognition rate of the symbol arrangement pattern 13.

Further, the symbol arrangement pattern 13 in the visual pattern 1 may be colored in multiple colors. In this case, it is preferable that a control pattern (a color information pattern) that indicates color information is added in the visual code 1. As the control pattern that indicates the color information, for instance, a pattern that expresses eight to twenty-four bit binary information that indicates a color (e.g. 00000000 indicates black, 11111111 indicates white, etc.) can be used. In this case, it is preferable that the function of setting colors of the symbol arrangement pattern 13 is added to the symbol arrangement forming unit of the visual code generating apparatus 3, and the function of generating the control pattern that indicates the color information and placing the control pattern in the code space 11 is added to the control pattern forming unit 63.

The present invention may be modified within the scope not departing from the idea or the essential features thereof that can be read from the claims and the whole of the description, and the technical idea on which the present invention is based involves such a modified article with a visual code, a visual code generating apparatus, and an information conveying method.

DESCRIPTION OF REFERENCE NUMBERS 1, 51, 53 visual code
2 information board (article)
3 visual code generating apparatus
4 visual code reading apparatus
11 code space (two-dimensional space)
12 region
13 symbol arrangement pattern
14 symbol pattern
15 pattern element
21, 22, 23 guide pattern
24 expansion pattern
25 arrangement information pattern
26 discriminating information pattern
41 combined information
42 message text information (text information)
43 symbol parameter (binary information)
45 linked information
52 electronic circuit board (article)
54 chocolate candy (article)
61 symbol arrangement pattern forming unit (pattern forming unit)
62 information linking unit
63 control pattern forming unit (guide pattern forming unit, arrangement information forming unit, discriminating information pattern forming unit, color information pattern forming unit)
64 storing unit
65 information input/output unit
81 reading unit
82 storing unit (storing medium)
83 recognizing unit
84 information input/output unit
86 display unit

What is claimed is:

1. An article characterized in that the article has a visual code wherein a symbol arrangement pattern, which comprises a single symbol pattern or a plurality of symbol patterns that indicate a message that can be visually recognized by a human, is formed by selecting one or more than one region from among a plurality of regions arranged like a grid in a two-dimensional space, and placing a pattern element with a predetermined shape in each of the selected regions; each of the regions where the pattern element is placed so as to form the symbol arrangement pattern among the plurality of regions in the two-dimensional space indicates ON; each of the regions where the pattern element is not placed so as to form the symbol arrangement pattern among the plurality of regions in the two-dimensional space indicates OFF; and linked information that is different from the message is linked to binary information that is specified by the regions indicating ON and the regions indicating OFF, corresponds to the symbol arrangement pattern, and can be recognized by an apparatus with an optical reading function, and wherein a guide pattern, which enables a reading apparatus to correct a misalignment between the reading apparatus and the visual code, or enables the reading apparatus to recognize a reading direction of the visual code, when the reading apparatus reads the visual code, is placed in the two-dimensional space where the visual code is formed.

2. An article according to claim 1 characterized in that an arrangement information pattern, which indicates the number of columns, the number of rows or the number of symbols of the symbol arrangement pattern, is placed in the two-dimensional space where the visual code is formed.

3. An article according to claim 1 characterized in that a plurality of pieces of linked information are linked to the binary information, and a discriminating information pattern for discriminating the plurality of pieces of linked information linked to the binary information is placed in the two-dimensional space where the visual code is formed.

4. An article according to claim 1 characterized in that a color information pattern, which indicates a color of the symbol arrangement pattern, is placed in the two-dimensional space where the visual code is formed.

5. A visual code generating apparatus characterized in that the visual code generating apparatus is an apparatus for generating a visual code by making a link between a symbol arrangement pattern, which can be visually recognized as a message by a human and can be recognized by an apparatus with an optical reading function, and linked information that is different from the message, the visual code generating apparatus comprises:

a pattern forming unit for forming a symbol arrangement pattern, which comprises a single symbol pattern or a plurality of symbol patterns that indicate a message that can be visually recognized by a human, by selecting one or more than one region from among a plurality of regions arranged like a grid in a two-dimensional space, and placing a pattern element with a predetermined shape in each of the selected regions;

an information linking unit for recognizing each of the regions where the pattern element is placed so as to form the symbol arrangement pattern among the plurality of regions in the two-dimensional space where the symbol arrangement pattern is formed by the pattern forming unit, as ON, recognizing each of the regions where the pattern element is not placed so as to form the symbol arrangement pattern among the plurality of regions in the two-dimensional space where the symbol arrangement pattern is formed by the pattern forming unit, as OFF, and linking linked information that is different from the message to binary information that is specified by the regions recognized as ON and the regions recognized as OFF, corresponds to the symbol arrangement pattern, and can be recognized by an apparatus with an optical reading function;

a storing unit for storing the symbol patterns in advance, and also correlating the symbol arrangement pattern formed by the pattern forming unit, to the linked information linked to the binary information corresponding to the symbol arrangement pattern by the information linking unit, and storing the symbol arrangement pattern and the linked information correlated to each other;

an outputting unit for outputting the symbol arrangement pattern and the linked information stored in the storing unit; and a selecting unit for selecting the symbol pattern included in the symbol arrangement pattern from among the symbol patterns stored in advance in the storing unit, when the pattern forming unit forms the symbol arrangement pattern.

6. A visual code generating apparatus according to claim 5 characterized in that the visual code generating apparatus further comprises a guide pattern forming unit for placing a guide pattern, which enables a reading apparatus to correct a misalignment between the reading apparatus and the visual code, or enables the reading apparatus to recognize a reading direction of the visual code, when the reading apparatus reads the visual code, in the two-dimensional space.

7. A visual code generating apparatus according to claim 5 characterized in that the visual code generating apparatus further comprises an arrangement information pattern forming unit for placing an arrangement information pattern, which indicates the number of columns, the number of rows or the number of symbols of the symbol arrangement pattern, in the two-dimensional space.

8. A visual code generating apparatus according to claim 5 characterized in that the information linking unit links a plurality of pieces of linked information to the binary information, and the visual code generating apparatus further comprises a discriminating information pattern forming unit for placing a discriminating information pattern for discriminating the plurality of pieces of linked information linked to the binary information, in the two-dimensional space.

9. A visual code generating apparatus according to claim 5 characterized in that the pattern forming unit sets a color of the symbol arrangement pattern, and the visual code generating unit further comprises a color information pattern forming unit for placing a color information pattern, which indicates a color of the symbol arrangement pattern, in the two-dimensional space.

10. An information conveying method comprises:

a step of generating a visual code by using a visual code generating apparatus for generating the visual code wherein a symbol arrangement pattern, which comprises a single symbol pattern or a plurality of symbol patterns that indicate a message that can be visually recognized by a human, is formed by selecting one or more than one region from among a plurality of regions arranged like a grid in a two-dimensional space, and placing a pattern element with a predetermined shape in each of the selected regions; each of the regions where the pattern element is placed so as to form the symbol arrangement pattern among the plurality of regions in the two-dimensional space indicates ON; each of the regions where the pattern element is not placed so as to form the symbol arrangement pattern among the plurality of regions in the two-dimensional space indicates OFF; and linked information that is different from the message is linked to binary information that is specified by the regions indicating ON and the regions indicating OFF, corresponds to the symbol arrangement pattern, and can be recognized by an apparatus with an optical reading function;

a step of storing, in a storing medium of a reading apparatus, a combined information, which includes a combination of text information that indicates the message in the visual code generated by the visual code generating apparatus and the linked information, or a combination of the binary information and the linked information;

a step of reading the visual code from an article after the article having the visual code is put at a place that can be seen by a human; and a step of specifying the linked information corresponding to the visual code read by the reading apparatus on the basis of the combined information stored in the storing medium of the reading apparatus, and outputting the specified linked information from the reading apparatus.

* * * * *